(12) United States Patent
Stoller

(10) Patent No.: US 10,564,311 B2
(45) Date of Patent: Feb. 18, 2020

(54) FORMATION IMAGING USING NEUTRON ACTIVATION

(71) Applicant: Schlumberger Technology Corporation, Sugar Land, TX (US)

(72) Inventor: Christian Stoller, Princeton Junction, NJ (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 14/041,206

(22) Filed: Sep. 30, 2013

(65) Prior Publication Data
US 2015/0090870 A1    Apr. 2, 2015

(51) Int. Cl.
*G01V 5/02* (2006.01)
*G01V 5/10* (2006.01)

(52) U.S. Cl.
CPC .................... *G01V 5/101* (2013.01)

(58) Field of Classification Search
CPC ........ G01V 5/101; G01V 5/102; G01V 5/104; E21B 47/1015; G01N 23/222
USPC ..................................................... 250/269.7
See application file for complete search history.

(56) References Cited

U.S. PATENT DOCUMENTS

| | | | | |
|---|---|---|---|---|
| 4,071,757 | A | * | 1/1978 | Arnold ............... E21B 47/1015 250/265 |
| 5,097,123 | A | * | 3/1992 | Grau ..................... G01V 5/101 250/264 |
| 5,459,314 | A | * | 10/1995 | Plasek ....................... 250/269.7 |
| 5,539,225 | A | | 7/1996 | Loomis et al. |
| 6,703,606 | B2 | | 3/2004 | Adolph |
| 6,781,115 | B2 | | 8/2004 | Stoller et al. |
| 6,944,548 | B2 | | 9/2005 | Radtke et al. |
| 7,073,378 | B2 | | 7/2006 | Smits et al. |
| 7,081,616 | B2 | | 7/2006 | Grau et al. |
| 7,365,307 | B2 | | 4/2008 | Stoller et al. |
| 2004/0079526 | A1 | * | 4/2004 | Cairns et al. .............. 166/255.2 |
| 2005/0127282 | A1 | * | 6/2005 | Grau et al. .................... 250/262 |
| 2009/0045329 | A1 | | 2/2009 | Stoller |
| 2010/0193676 | A1 | * | 8/2010 | Jacobson et al. ......... 250/269.6 |
| 2011/0049345 | A1 | * | 3/2011 | Roberts ..................... 250/269.6 |
| 2012/0091329 | A1 | * | 4/2012 | Chace et al. .............. 250/269.7 |
| 2013/0105678 | A1 | * | 5/2013 | Wilson et al. ................ 250/254 |
| 2014/0138529 | A1 | * | 5/2014 | Grau et al. ................ 250/269.6 |

* cited by examiner

*Primary Examiner* — David P Porta
*Assistant Examiner* — Mamadou Faye
(74) *Attorney, Agent, or Firm* — Trevor G. Grove

(57) ABSTRACT

A method for determining azimuthal formation information using neutron activation, wherein the formation is activated by a neutron source and the activation signal is measured by at least one detector trailing the neutron source during the logging operation. The number of detected gamma rays as a function of the detector azimuth may be used to provide azimuthal information for determining an image of the formation surrounding the borehole.

31 Claims, 11 Drawing Sheets

FORMATION IMAGING USING NEUTRON ACTIVATION

FIELD OF THE DISCLOSURE

This disclosure related to well logging, and more particularly, to the determination of azimuthal information in well logging.

BACKGROUND

Obtaining azimuthal information has been an important aspect in well logging for many decades. Initially, wireline measurements, in particular of resistivity, were used to determine the dip of formations penetrated by a well bore with respect to the axis of the wellbore. These measurements were expanded and refined to obtain high resolution resistivity images.

The advent of logging while drilling (LWD) and measurement while drilling (MWD) tools, which are incorporated in the drill string and allow measurements during the drilling process opened new possibilities and brought new applications. The fact that the tool is rotating during the drilling process makes it possible to perform an azimuthal and axial scan during the drilling process, if the instrument has sufficient azimuthal and axial resolution.

In particular, obtaining azimuthal measurements and making images from nuclear logs became a possibility as indicated for example in U.S. Pat. Nos. 5,539,225, 6,944,548 and 7,073,378 assigned to Schlumberger regarding imaging using tools equipped with neutron sources. Images can also be obtained from tools using gamma ray sources or from tools that detect natural gamma rays.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A first application is directed to the azimuthal and axial measurement of gamma rays resulting from the activation of a formation by neutrons emitted by a neutron source contained in a downhole tool.

A further application is directed to the correction of the acquired data for variations in the neutron output of the neutron source.

Yet another application is related to the subtraction of the background caused by oxygen activation in the borehole mud.

Yet another application is directed to a correction of the measurement for the contribution of the background from natural gamma rays.

A method aspect is directed to a method of logging a formation having a borehole therein. The method may include lowering a well logging instrument into the borehole, and detecting incoming radiation from the formation using a radiation detector carried by the well logging instrument and measuring the radiation as a function of axial and azimuthal location of the detector with respect to the borehole.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers separated by century refer to like elements throughout.

The bottom-hole-assembly (BHA) and/or other portions of a drill string may include one or more logging-while-drilling (LWD) and/or measurement-while-drilling (MWD) tools to, for example, perform various downhole measurements during drilling operations. The BHA may include a neutron source and sensors associated with the neutron measurement. It may also include one or more gamma ray detectors positioned axially above or below such neutron source.

Figure 1:
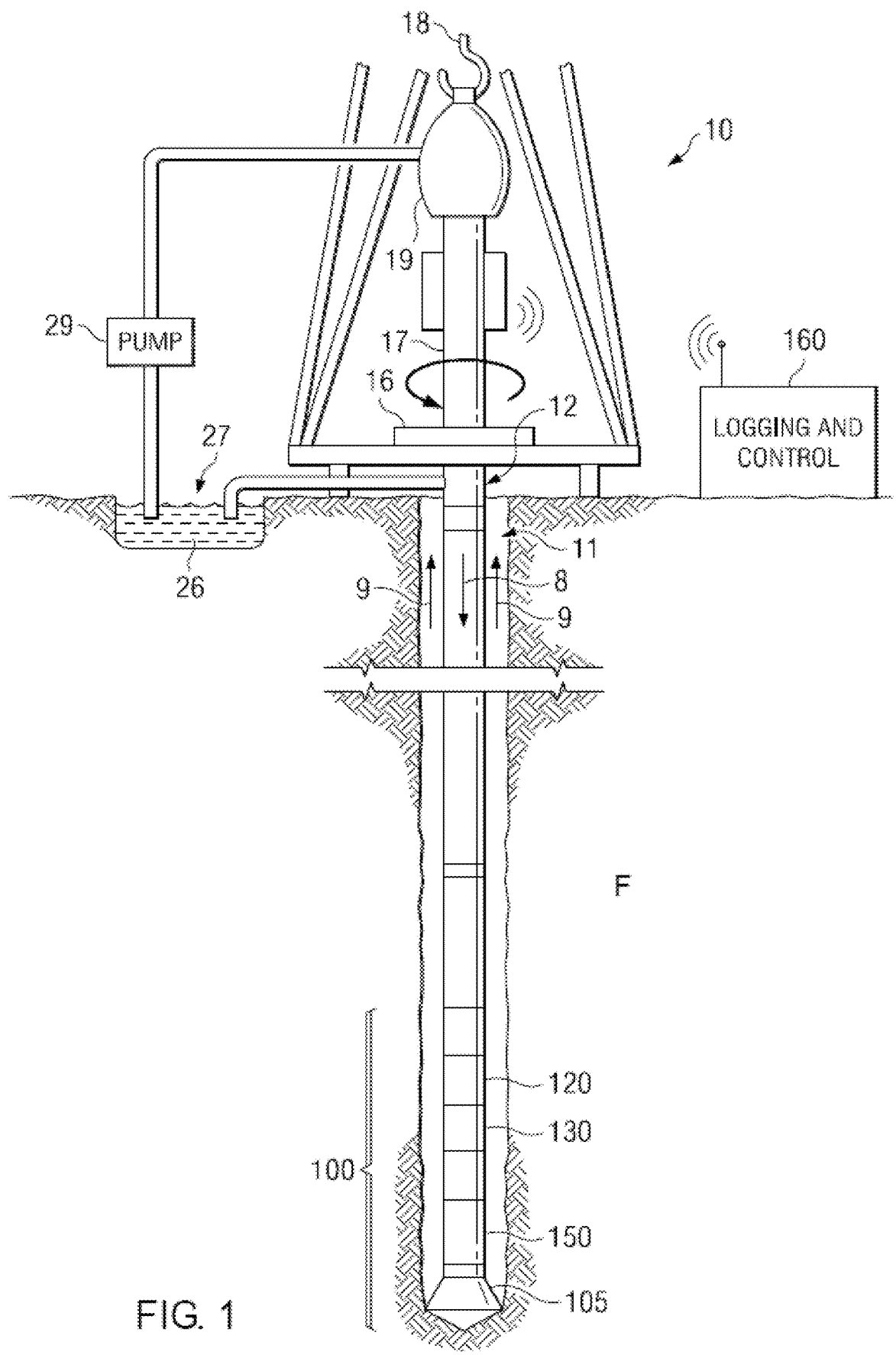
FIG. 1 is a depiction of a logging while drilling operation showing the principal components used for the drilling and logging and measurement while drilling.

FIG. 1 is a schematic view of at least a portion of an example wellsite system that may be employed onshore and/or offshore according to one or more aspects of the present disclosure, where a wellbore 11 may have been formed in one or more subsurface formations F by rotary and/or directional drilling. As depicted in FIG. 1, a conveyance means 12 suspended within the wellbore 11 may comprise or be connected to a BHA 100, which may have a drill bit 105 at its lower end. The conveyance means 12 may comprise drill pipe, wired drill pipe (WDP), tough logging conditions (TLC) pipe, coiled tubing, and/or other means of conveying the BHA 100 within the wellbore 11.

The surface system at the wellsite may comprise a platform and derrick assembly 10 positioned over the wellbore 11. The assembly 10 may include a rotary table 16, a Kelly 17, a hook 18, and/or a rotary swivel 19. The conveyance means 12 may be rotated by the rotary table 16, energized by means not shown, which may engage the Kelly 17 at the upper end of the conveyance means 12. The conveyance means 12 may be suspended from the hook 18, which may be attached to a traveling block (not shown), and through the Kelly 17 and the rotary swivel 19, which permits rotation of the drill string 12 relative to the hook 18. Additionally, or alternatively, a top drive system may be used.

The surface system may also include drilling fluid 26, which is commonly referred to in the industry as mud, stored in a pit 27 formed at the well site. A pump 29 may deliver the drilling fluid 26 to the interior of the conveyance means 12 via a port (not shown) in the swivel 19, causing the drilling fluid to flow downwardly through the conveyance means 12 as indicated by the directional arrow 8. The drilling fluid 26 may exit the conveyance means 12 via ports in the drill bit 105, and then circulate upwardly through the annulus region between the outside of the conveyance means 12 and the wall of the wellbore, as indicated by the directional arrows 9. The drilling fluid 26 may be used to lubricate the drill bit 105, carry formation cuttings up to the surface as it is returned to the pit 27 for recirculation, and/or create a mud cake layer (not shown) on the walls of the wellbore 11. Although not pictured, one or more other circulation implementations are also within the scope of the present disclosure, such as a reverse circulation implementation in which the drilling fluid 26 is pumped down the annulus region (i.e., opposite to the directional arrows 9) to return to the surface within the interior of the conveyance means 12 (i.e., opposite to the directional arrow 8).

The BHA 100 may include any number and/or type(s) of downhole tools, schematically depicted in FIG. 1 as tools 120, 130, and 150. Examples of such downhole tools include an acoustic tool, a density tool, a directional drilling tool, a DFA tool, a drilling tool, an EM tool, a fishing tool, a formation evaluation tool, a gamma density tool, a gamma ray tool, a gravity tool, an intervention tool, an LWD tool, a magnetic resonance tool, an MWD tool, a monitoring tool, a mud logging tool, a neutron tool, a neutron porosity tool, a neutron gamma density tool, a nuclear tool, a perforating tool, a photoelectric factor tool, a porosity tool, a reservoir characterization tool, a reservoir fluid sampling tool, a reservoir pressure tool, a reservoir solid sampling tool, a resistivity tool, a seismic tool, a stimulation tool, a surveying tool, a telemetry tool, and/or a TLC tool, although other downhole tools are also within the scope of the present disclosure. One or more of the downhole tools 120, 130, and 150, and/or the logging and control system 160, may be utilized to perform at least a portion of a method according to one or more aspects of the present disclosure.

The downhole tools 120, 130, and/or 150 may be housed in a special type of drill collar, as it is known in the art, and may include capabilities for measuring, processing, and/or storing information, as well as for communicating with the other downhole tools 120, 130, and/or 150, and/or directly with surface equipment, such as the logging and control system 160. Such communication may utilize any conventional and/or future-developed two-way telemetry system, such as a mud-pulse telemetry system, a wired drill pipe telemetry system, an electromagnetic telemetry system, and/or an acoustic telemetry system, among others within the scope of the present disclosure. One or more of the downhole tools 120, 130, and/or 150 may also comprise an apparatus (not shown) for generating electrical power for use by the BHA 100. Example devices to generate electrical power include, but are not limited to, a battery system and a mud turbine generator powered by the flow of the drilling fluid.

During drilling operations, the downhole tools 120, 130, and/or 150 may be operable to perform measurements that may be utilized to characterize downhole conditions and/or formation properties. This information may be transmitted to the surface in real time, such as via an MWD one of the downhole tools 120, 130, and/or 150. Acquiring formation/wellbore data as early as possible during drilling operations may be desired for proactive geosteering operations and well control. Thus, logging sensors of one or more of the downhole tools 120, 130, and/or 150 may be located as close as possible to the drill bit 105 when possible.

It is well known that azimuthal information can be obtained from nuclear measurements performed downhole. Such azimuthal information may be used to determine the formation dip with respect to the borehole axis. It may also be used, as an example, for geosteering, i.e. to steer the tool in one or more formation layers according to a predetermined plan. Steering information may be obtained from any suitable imaging device in the BHA. This may include density images from a gamma-gamma density measurement and natural gamma ray images for an example.

Natural gamma ray images have been used for geosteering and other applications for many years as the sensor can be placed very close to the drill bit 105. However, the images obtained may be limited in their azimuthal and vertical resolution and may be noisy because of the limited counting statistics of the measurement.

Gamma density images may involve the use of a radioactive logging source (although it should be noted that some gamma density images may not involve the use of a radioactive logging source) and because of environmental or security concerns the use of such a source may not be practical. Also, the depth of investigation of the gamma-gamma density measurement is limited and borehole effects may reduce the accuracy.

It is therefore necessary to provide an alternative method for obtaining nuclear images, which have better statistical precision while not necessitating the use of a radioisotopic source. A different kind of image, with high lithology sensitivity can be obtained by measuring the formation activation caused by a neutron source in the BHA. In the past, this activation effect has generally been considered a nuisance, since it is detrimental to the measurement of natural gamma rays. However, the measurement and imaging of activation gamma rays opens new opportunities for obtaining azimuthal formation information relevant not only to geosteering, but among many things to the determination of fractures in the formation and to the measurement of dip angles.

The interaction of the neutrons with elements in the formation, borehole and the tool will lead to gamma rays from inelastic and capture neutron reactions. Many of these reactions result in the emission of gamma rays with energies >3 MeV. It has been proposed to obtain images from inelastic and capture gamma rays as indicated in U.S. Pat. No. 6,944,548. However, the high energy of the gamma rays makes it difficult to obtain adequate azimuthal and axial resolution given the limited room available for shielding. Most activation, with the exception of O-activation results in gamma rays of energies <3 MeV. This makes it possible to obtain an image with high vertical and azimuthal resolution.

Figure 2:
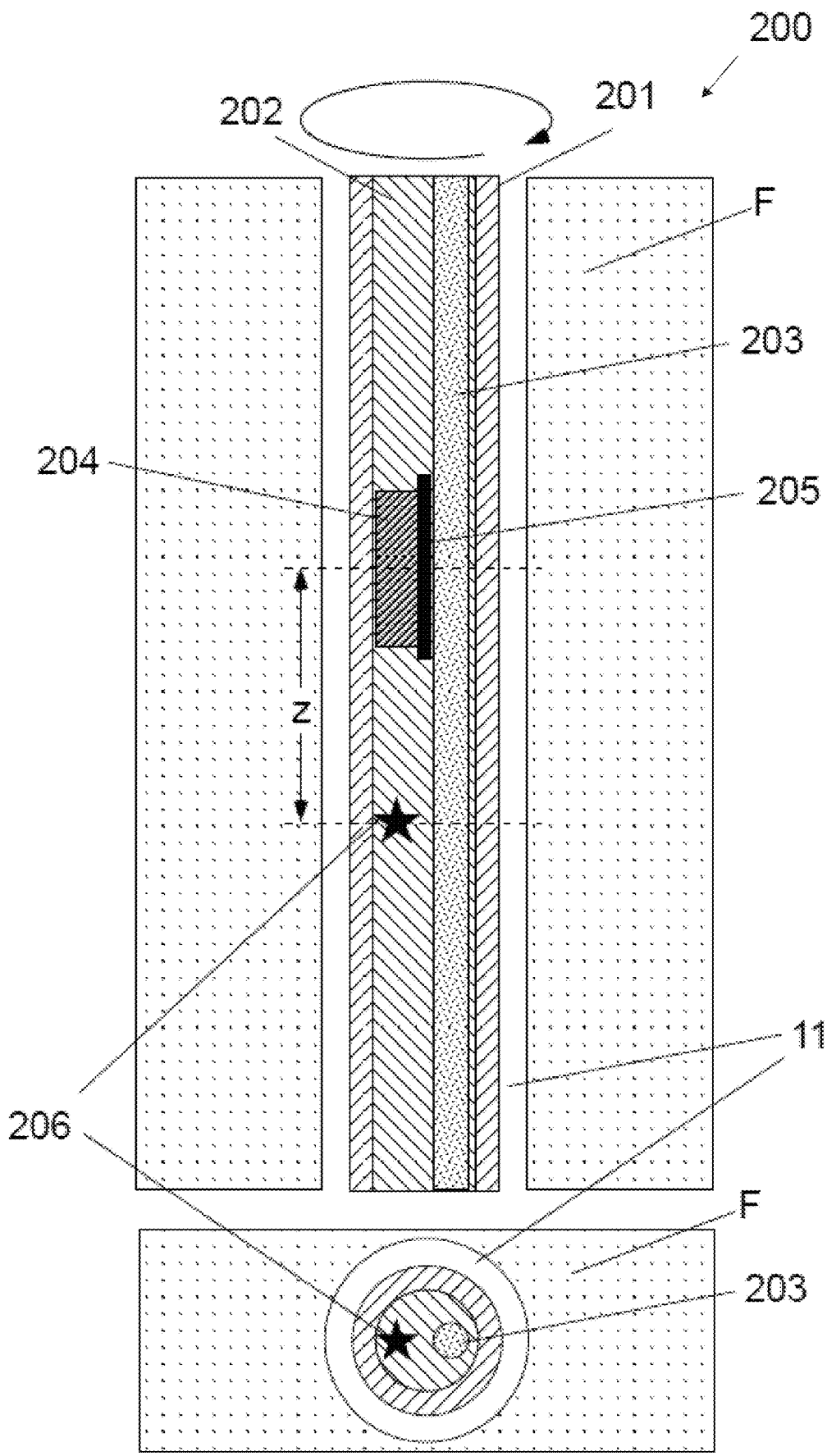
FIG. 2 is a logging while drilling tool traversing a formation. The tool is equipped with a neutron source and a detector to detect radiation from the formation activation.

FIG. 2 shows an LWD instrument 200 equipped with a neutron source 206 and a gamma ray detector 204. The tool 200 consists of a drill collar 201 with a chassis 202 inside and a path 203, e.g. a mud channel or a flow tube, for the mud flowing down through the tool. The gamma ray detector may be shielded to the back and the sides by shielding 205 to improve the directionality of the response. The neutron source and the gamma ray detector are separated by an axial distance z.

The neutron source may be a radioisotopic source such as $^{241}$AmBe or $^{252}$Cf as an example or an electronic neutron generator, such as a d-T generator of 14-MeV neutrons, which may or may not be pulsed. The use of a neutron generator is advantageous not only due to the elimination of the radioisotopic source but also because it provides higher energy neutrons and a higher neutron flux. A typical neutron logging source may provide $10^7$ to $4\times10^7$ neutrons/s for AmBe and up to $10^8$ neutrons/s for $^{252}$Cf with respective average energies of about 4 and 2 MeV. A d-T neutron generator provides $10^8$ to $10^9$ neutrons/s at 14 MeV. Several elements or more specifically isotopes do only get activated by fast neutrons with energies exceeding 5 to 10 MeV. Only a small fraction of the neutrons emitted by AmBe and $^{252}$Cf have energy above that threshold and therefore these radio-isotopic sources are not suited for fast neutron activation.

Most electronic neutron generators used in downhole applications are pulsed generators relying on the d-T reaction. However, other neutron generators, which may or may not be pulsed can be used as well. Non-limiting examples of other neutron generators are d-D generators that produce 2.5 MeV neutrons or t-T generators that produce neutrons with energy from less than 1 MeV to about 10 MeV. The two generators mentioned above are less suitable for exploiting activation through fast neutron reactions. However, they can be employed if activation by slow (e.g. thermal and epithermal) neutrons is of particular interest. In yet another approach a generator allowing the selective generation of d-D and d-T neutrons as an example could be used. An example of such a generator is described in US Patent application 20090045329.

The table below provides some examples of isotopes of typical formation elements that may be activated by fast neutron interactions or by the capture of low energy (thermal or epithermal) neutrons. Where available cross section data for the reaction at 14 MeV or at thermal energy (thermal neutron capture) are provided.

TABLE 1

Selected formation elements and their activation cross sections

| Element | Isotope | Reaction | Cross section [mb@14 MeV] | Thermal Cross section [mb] | Relative abundance of isotope [%] | Gamma rays [MeV] | Half-life |
|---|---|---|---|---|---|---|---|
| O | $^{16}$O | $^{16}$O(n,p)$^{16}$N | 42 | | 99.8 | 7.11 6.13 | 7.14 s |
| Na | $^{23}$Na | $^{23}$Na(n,p)$^{23}$Ne | 50 | | 100 | 0.439 1.64 | 38 s |
| | | $^{23}$Na(n,γ)$^{24}$Na | | 530 | 100 | 1.369 2.754 | 15 h |
| Mg | $^{24}$Mg | $^{24}$Mg(n,p)$^{24}$Na | 200 | | 79 | 1.369 2.754 | 15 h |
| Al | $^{27}$Al | $^{27}$Al(n,α)$^{24}$Na | 150 | | 100 | 1.369 2.754 | 15 h |
| | $^{27}$Al | $^{27}$Al(n,p)$^{27}$Mg | 15 | | 100 | 0.84 1.013 | 570 s |
| | $^{27}$Al | $^{27}$Al(n,γ)$^{28}$Al | | 200 | 100 | 1.78 | 135 s |
| Si | $^{28}$Si | $^{28}$Si(n,p)$^{28}$Al | 300 | | 92 | 1.78 | 135 s |
| Cl | $^{35}$Cl | $^{35}$(n,2n)$^{34m}$Cl | 10 | | 76 | 0.145 0.511 1.17 2.12 3.3 | 1956 s |
| K | $^{39}$K | $^{39}$K(n,2n)$^{38}$K | | | 93 | 0.511 2.170 | 462 s |
| | $^{41}$K | $^{41}$K(n,p)$^{41}$Ar | | | 7 | 1.293 | 1.83 h |
| Ca | $^{44}$Ca | $^{44}$Ca(n,p)$^{44}$K | 25 | | 2 | 1.156 1.74 2.1 | 1320 s |
| Fe | $^{56}$Fe | $^{56}$Fe(n,p)$^{56}$Mn | 130 | | 92 | 0.847 1.811 2.11 | 2.58 h |
| Ba | $^{138}$Ba | $^{138}$Ba(n,2n)$^{137m}$Ba | 1250 | | 72 | 0.662 | 155 h |

Activation can be described by a charging function. The number of activated nuclei in a material surrounding a neutron source can be written as:

$$N_{act}(t) = c \cdot N_{neutron} \cdot \left(1 - e^{-\left(\frac{t \cdot ln(2)}{T_{1/2}}\right)}\right) \quad (1)$$

where $N_{act}$ is the number of activated nuclei, c a constant, which depends on the cross sections and material composition, $N_{neutron}$ the neutron output of the source, t the elapsed time since the start of activation and $T_{1/2}$ the half-life of the isotope created by the activation.

Figure 3:
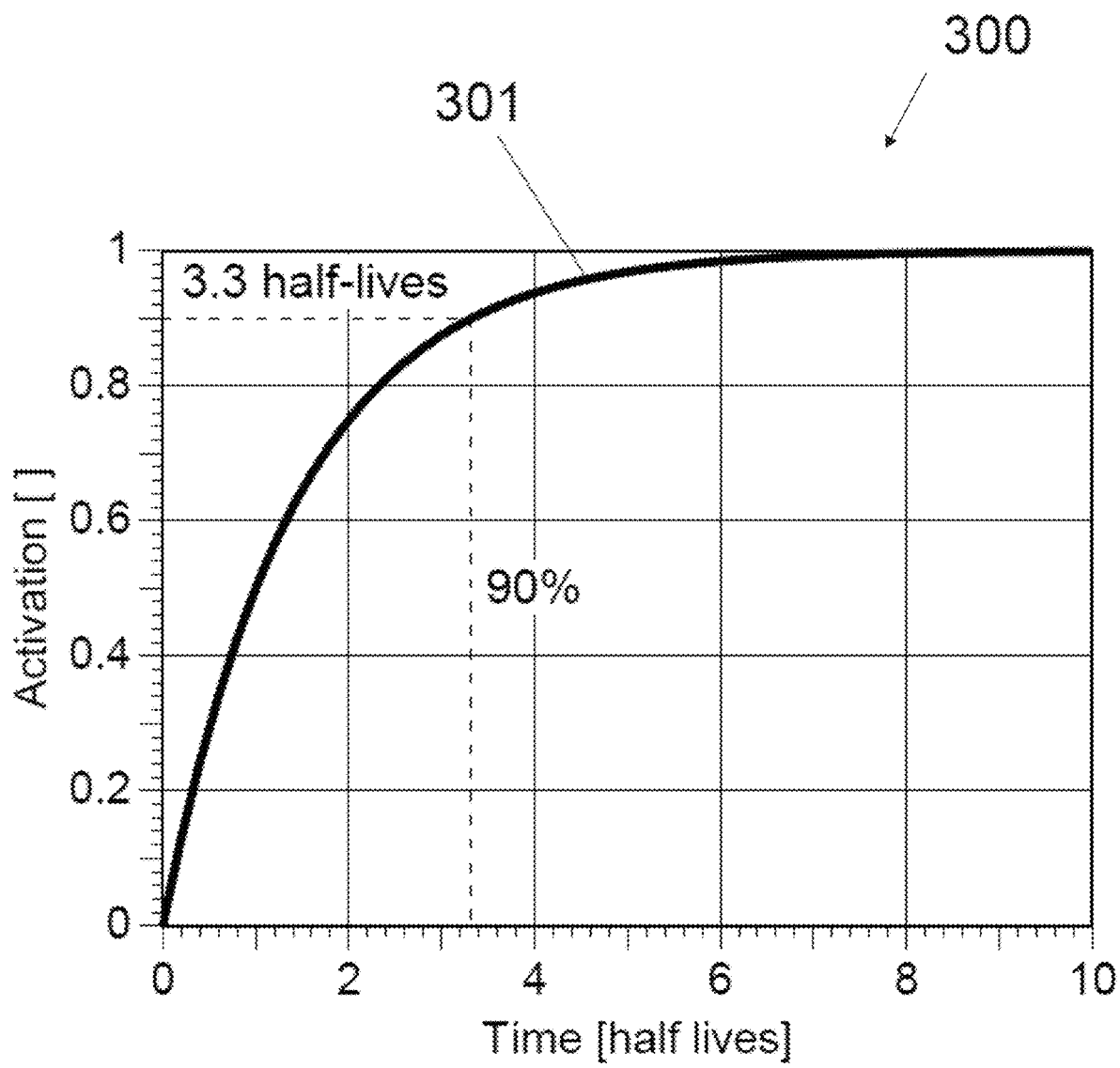
FIG. 3 shows the buildup of activation as a function of the half-life of an activated isotope.

FIG. 3 shows the progress of activation as a function of the time spent activating a material. The activation and therefore the number of decays of the activated material, is mainly a function of the activation cross section, the duration of the activation and the concentration (number density) of the isotope being activated. The x-axis in the plot 300 is in units of the half-life of the activated material. The curve 301 shows the progression of the activation as a function of time. After an infinite time the number of activation decays equals the number of activation reactions and no increase in activation is observed. 90% of the asymptotic activation is achieved after about 3.3 half-lives.

In most logging operations, the logging tool is moving during logging. This means that the amount of activation depends on the speed v, at which the logging tool is moving, i.e. the rate-of-penetration (ROP) in drilling application or on logging speed in wireline. Given that the depth of penetration of fast neutrons depends only weakly on the formation porosity and density, one can assume that formation activation of the formation happens over a distance of about ±15 cm from the axial location of the source and at a distance of 15 cm or more radially into the formation. This can be translated into an activation time as the time used for the tool to move by 30 cm (1 ft). In LWD, a typical ROP may be 30.5 m/h (100 ft/h). Therefore, activation of a 30 cm interval will occur over a period of 36 s. For all elements listed in Table 1 with the exception of Oxygen, this is much shorter than the half-life.

Once activation has ceased after a time $t_{act}$ the radioactive isotopes decay following an exponential decay law:

$$N_{act}(t + t_{act}) = N_{act}(t_{act}) \cdot e^{-\left(\frac{t \cdot \ln(2)}{T_{1/2}}\right)} \quad (2)$$

where $N_{act}(t+t_0)$ is the number of radioactive nuclei left after a time t after the end of the activation and $N_{act}(t_{act})$ is the number of activated nuclei at the end of activation. As indicated above, activation occurs over a limited axial distance from the neutron source and for the purpose of calculating the decrease of the activation that may take place before the gamma ray detector detects the previously activated formation the elapsed time t can be computed as the time it takes for the detector to travel the distance between the source and detector or a shortened distance taking into account that activation and detection happen over an extended distance of about ±15 cm from the source and the detector as an example.

As shown in FIG. 2, the gamma ray detector 204 is trailing the neutron source 206 while drilling, i.e. it is trailing the neutron source with respect to the axial direction of motion of the tool. The detector will therefore only reach the activated zone after a time t=z/v. For a spacing z of 120 cm and an ROP of 30.5 m/h this amounts to a time t=144 s. This means that the oxygen activation signal will be less than $10^{-6}$ times its maximum value and will no longer be detectable.

Figure 4:
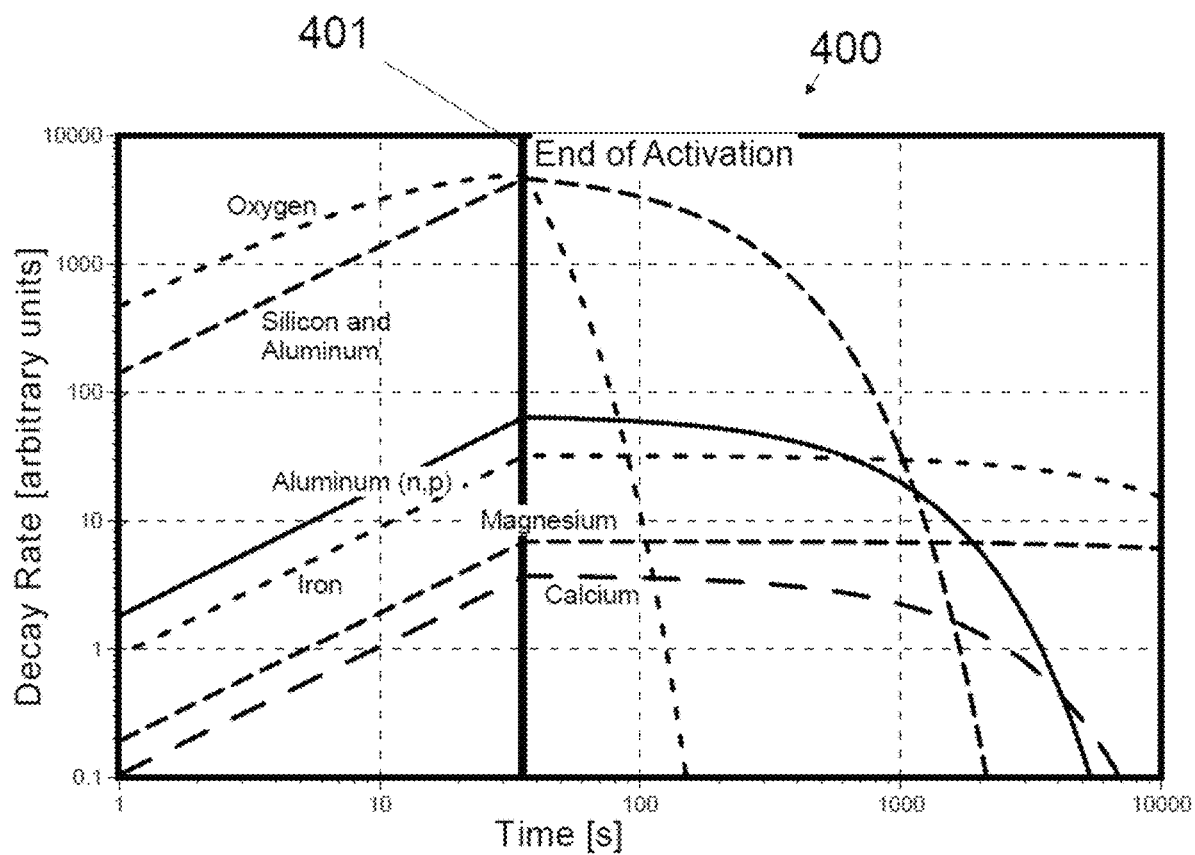
FIG. 4 is a schematic view of the importance of different elemental contributions to formation activation for a tool drilling at 100 ft/h and showing the activation and decay with time.

FIG. 4 gives a simplified representation of the activation and decay of several of the formation elements taking into account their relative activation cross sections and assuming an ROP of 30.5 m/h (100 ft/h). Both the abscissa and the ordinate use logarithmic scales. The activation time of 36 s ends at the line 401 and the decay of the activated isotopes starts. The following elements are shown: Oxygen, magnesium, aluminum, silicon, calcium and iron. As can be seen in Table 1, some activation mechanisms may lead to the same activated isotope for different elements. In this case, $^{27}$Al can be activated by neutron capture to form the radioactive isotope $^{28}$Al, which has a half-life of 135 s, through the reaction $^{27}$Al(n, γ)$^{28}$Al. $^{28}$Al can also be generated through a fast neutron reaction of $^{28}$Si, $^{28}$Si(n, p)$^{28}$Al, in which a proton in $^{28}$Si is replaced by a neutron to form $^{28}$Al.

As can be seen from FIG. 4 different activated elements will be more prominent depending on the time after activation, at which they are observed. Silicon is the most prominent element to be visible through activation and aluminum will be noticeable as well. Iron, which is often present in shales, may also be observable, while calcium may not provide a significant signal. This means that an imaging tool may be able to delineate transitions from sandstone to shales, or carbonates.

Figure 5:
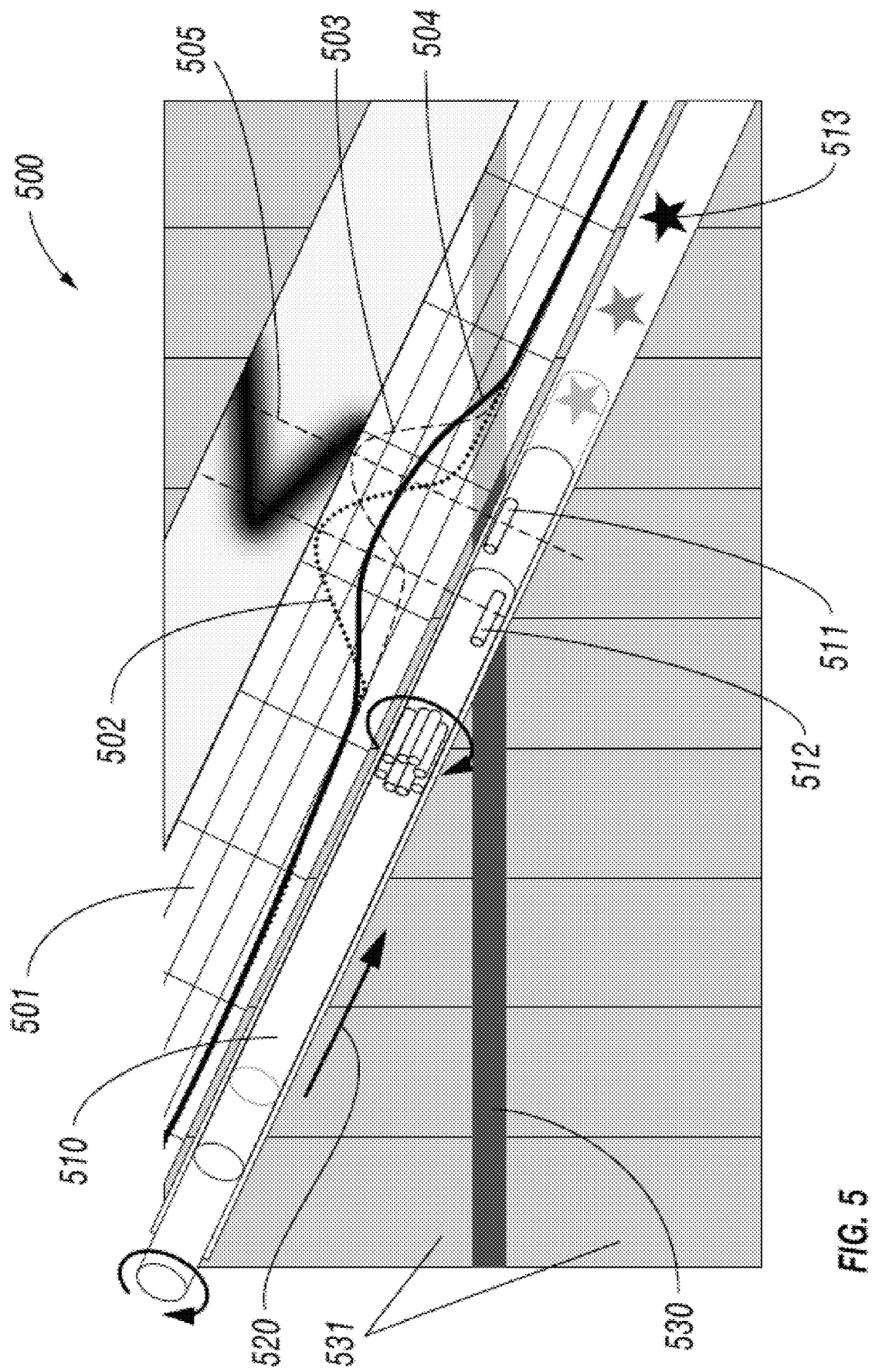
FIG. 5 is a schematic depiction of a logging while drilling tool traversing a formation layer, which can be activated easily. The dark color indicates a large number of counts from activation.

FIG. 5 provides an example of an activation image that could be observed with a logging while drilling tool. The tool 510 is moving downward through the formation in the direction of the arrow 520. The formation is shown as consisting of two different lithologies, where the layers 531 denote a formation with a low activation probability and layer 530 a high probability, as it may be encountered in sandstone, which consists mostly of $SiO_2$.

As the tool moves, isotopes of the various elements in the formation may get activated. In the sketch 500, it is assumed that neutrons are emitted into the formation isotropically from the neutron generator 513, which may be centered in the tool 510. Even if the generator is not centered, activation will occur close to isotropically as the tool makes several revolutions per second and the formation is irradiated uniformly around the tool. 501 is a simulated log of gamma ray activity resulting from the activation of the formation. Curve 502 represents the gamma ray activity seen as a function of axial displacement 520, when the detector is facing down (512) and detects predominantly gamma rays originating below the tool. Curve 503 represents the activity seen by the detector when facing up 511, while curve 504 shows the azimuthally averaged gamma ray activity.

In the simplified view in FIG. 5, it is assumed that there is no appreciable change in formation activation during the time $t_{traverse}$ it takes the detector facing down and the detector facing up to enter layer 530. If ROP and the predominant activated isotope are known, then the activation signal can be corrected for the finite half-life, i.e. the decay of activated isotopes during the time $t_{traverse}$.

The measurement may be biased by several effects such as the activation of the borehole fluid, which is moving up outside the logging tool if the measurement is performed on a drill string with mud circulating. The mud flowing up outside the tool passes the neutron source and becomes activated. The main component of the activation is activated oxygen ($^{16}$N). Given the velocity of the mud flow, the activated oxygen will still present, when the mud passes the gamma ray detector. This causes an interfering gamma ray background, which is unrelated to the formation activation. In the presence of constant mud flow and constant borehole size, this signal is only affected by the neutron output of the source. If necessary, the contribution can be subtracted out. One such approach is described in U.S. Pat. No. 7,081,616 assigned to Schlumberger.

Figure 6:
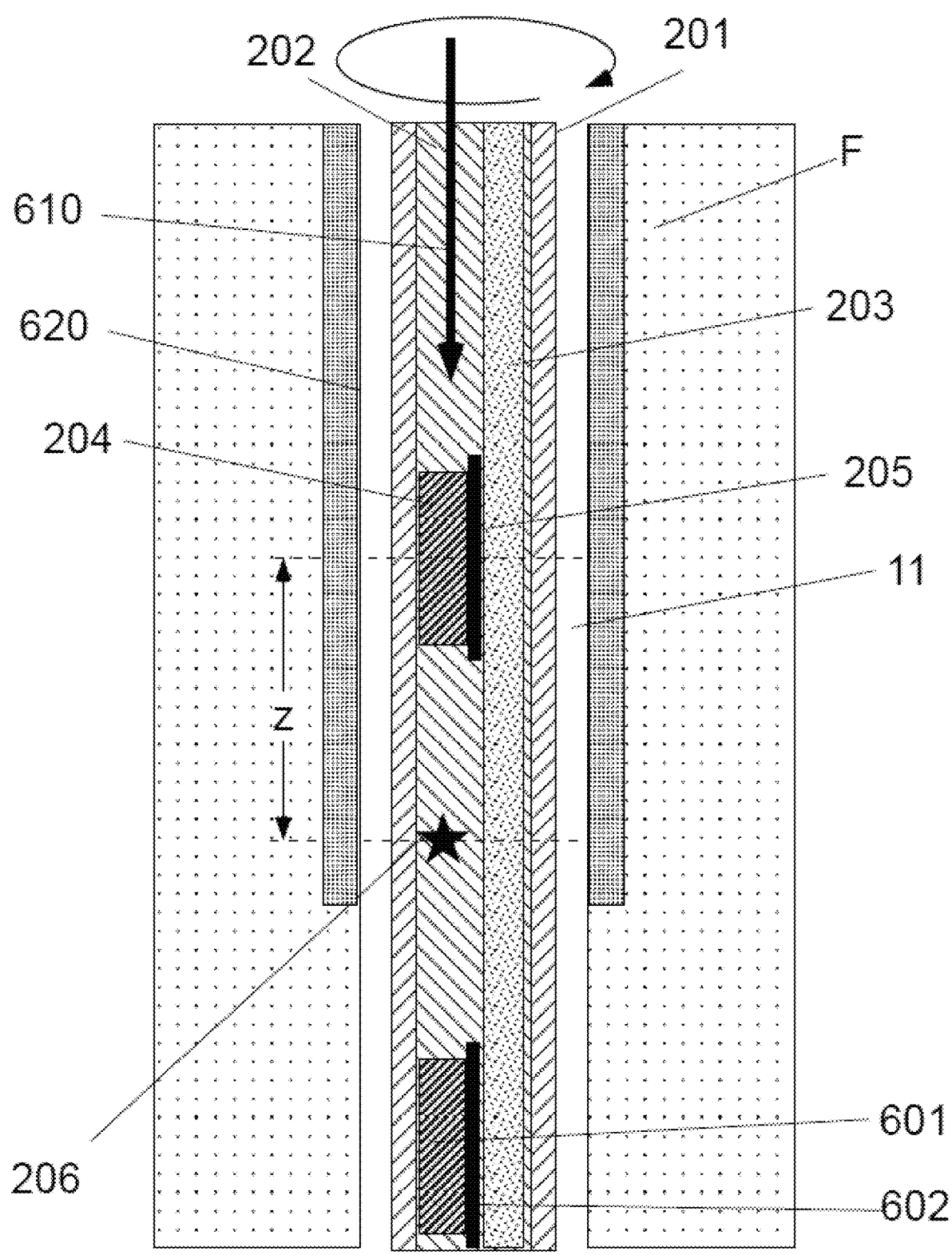
FIG. 6 is a schematic depiction of a logging while drilling tool with a leading gamma ray detector to determine the natural radioactivity of the formation.

If the activation signal is small, then contributions from natural radioactivity may cause interference, in particular in shales, which tend to have higher radioactivity. This contribution may be corrected for, if there is a gamma ray detector ahead of the tool movement (leading the neutron source), which is therefore not affected by formation activation. Such at tool is shown schematically in FIG. 6, which shows a tool with a second detector 601 leading the neutron detector in the direction of tool movement 610. The detector 601 may or may not have backshielding 602. The detector is ahead of the activation region 620 which is shown schematically around the tool.

Figure 7:
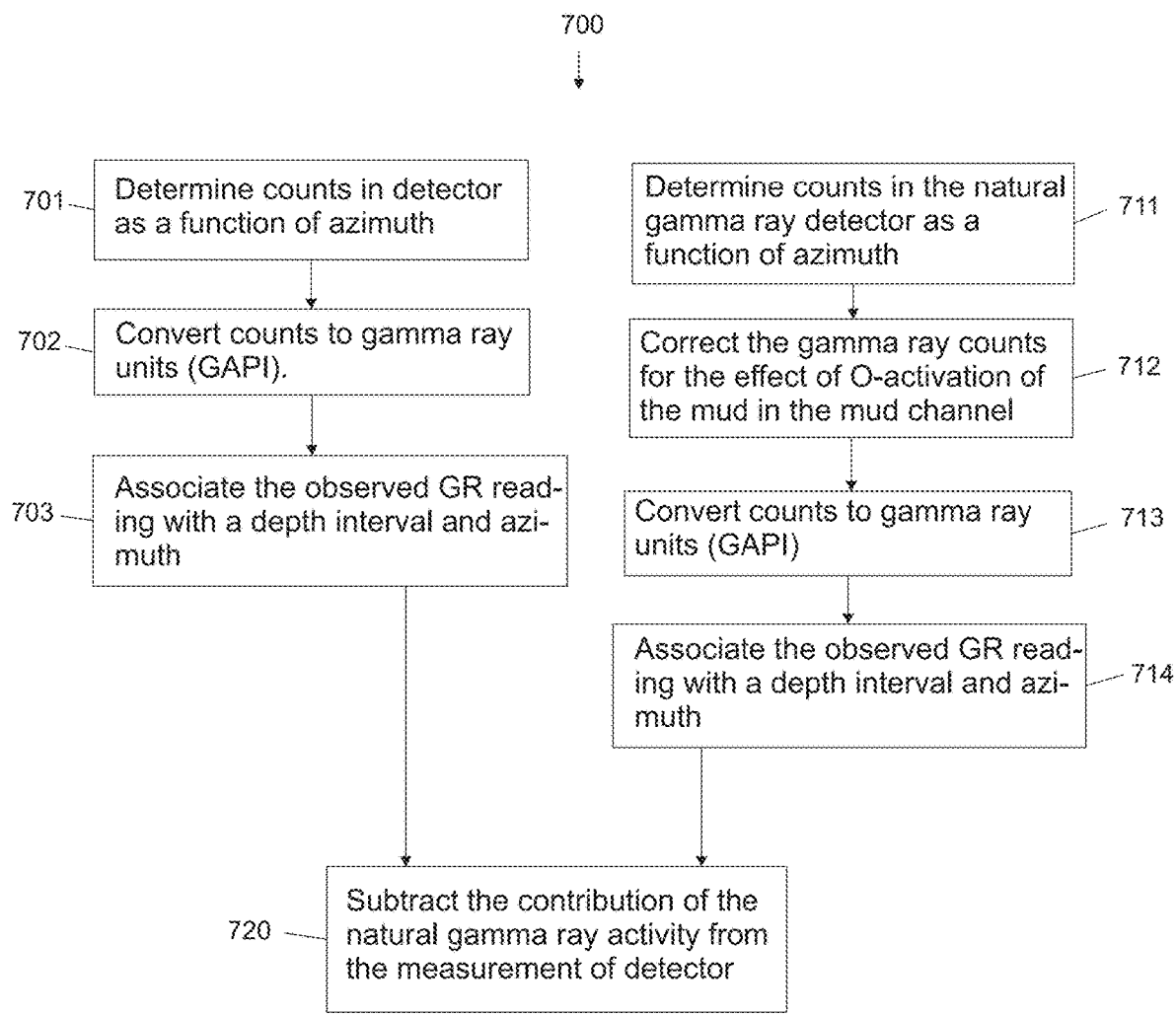
FIG. 7 is a flow diagram showing the subtraction of the correction of the activation gamma ray count for the contribution from natural gamma rays.

The gamma ray signal from such a leading detector may be used to correct the signal of the trailing detector for the effect of natural radioactivity as described in the flow diagram 700 of FIG. 7. Counts are detected in the leading detector 601 as a function of azimuth; the number of azimuthal sectors may depend on the azimuthal resolution of the detector. The detector 601 is affected by the oxygen activated in the mud channel, when it passes the neutron generator. The contribution from O-activation in the mud channel may be subtracted 712 as described in U.S. Pat. No. 7,081,616. The resulting counts may be converted to gamma ray units (GAPI) as indicated in 713. The measured gamma ray activity is then associated with the correct depth 714. A similar approach is taken for the measurements with the detector 204 trailing the neutron generator 206 by acquiring the counts 701, converting them to GAPI 702 and putting them on depth 703. In the final step 720, the gamma ray signal from step 714 is subtracted from the result of step 703 to obtain the net activation gamma ray.

The activation signal may also be affected by variation of the neutron output of the neutron source. The output of a radioisotopic source used in well logging is constant and does not vary over the period of time of downhole measurement. The output of a neutron generator may vary and may thus cause variations in activation that may be mistaken for formations features. This can be mitigated in several ways: (1) the neutron generator output may be regulated to be almost constant, i.e. to be within a few percent or less of a set value. This may involve the use of a neutron monitor in conjunction with the neutron generator such as described in U.S. Pat. No. 7,365,307 assigned to Schlumberger. (2) In the absence of a tight neutron output regulation or in the case of a sudden drop of the neutron output, a neutron monitor may provide information on the change in neutron output. Together with the knowledge of ROP, the activation signal observed by the gamma ray detector can be corrected for the change in neutron output as shown in FIG. 8.

Figure 8:
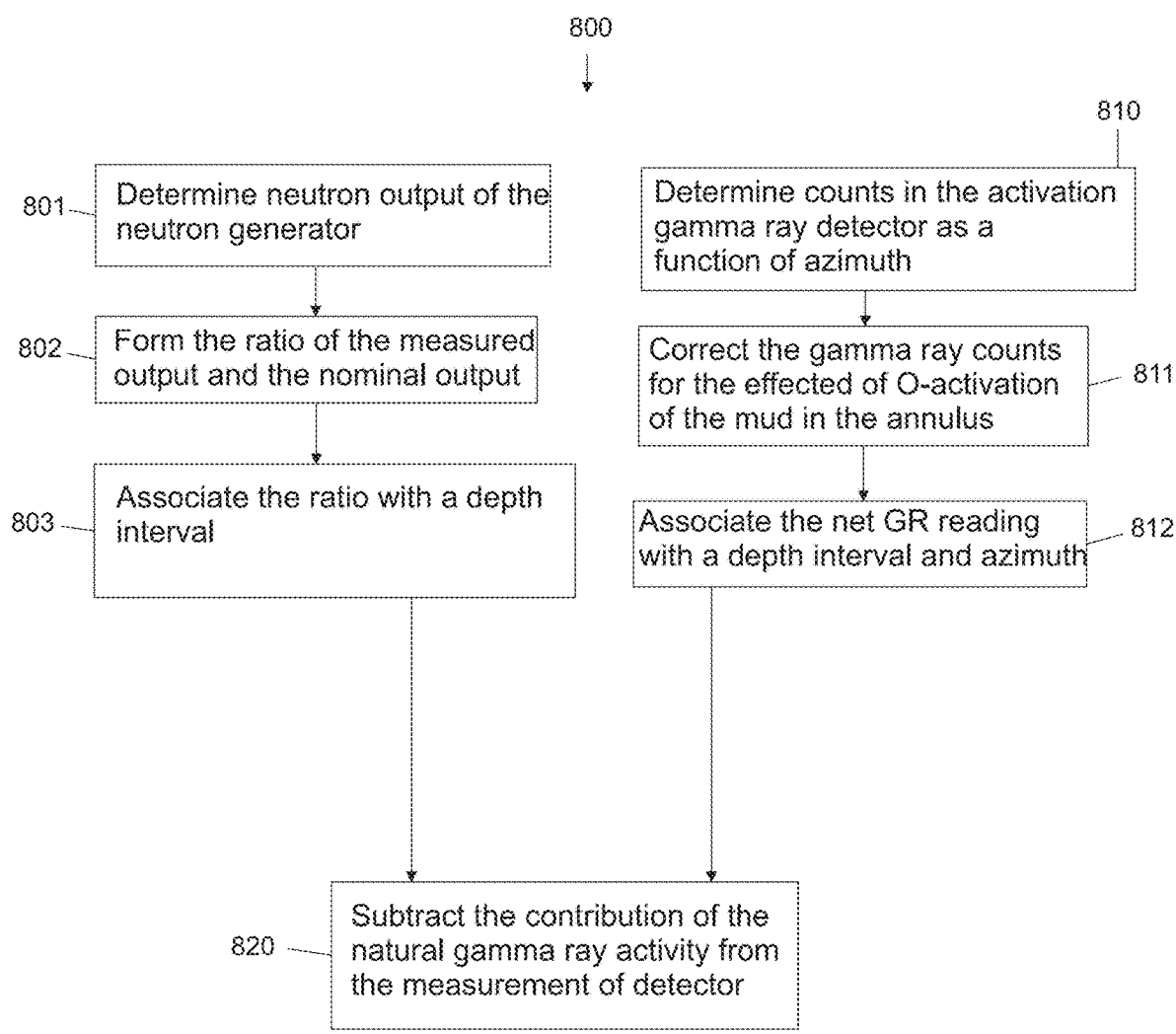
FIG. 8 is a flow diagram showing the correction for varying neutron output and for oxygen activation in the annulus.

The diagram 800 in FIG. 8 shows two corrections that may be applied to obtain a more accurate image. In a first correction 812, the acquired counts 811 are corrected for the O-activation contribution. This contribution may come from the activated mud in the annulus 11 of FIG. 1. Depending on the axial distance of the detector from the neutron source, there may also be a contribution from oxygen in the formation. The contribution may be subtracted by using the method detailed in U.S. Pat. No. 7,365,307 or any other suitable method. This results in a net signal, which is unaffected by oxygen activation. In step 812, the net signal is associated with a depth. This net signal may be corrected for changes in neutron output. In step 801 the neutron output may be measured by a neutron monitor known in the art. The neutron output is compared to the nominal output and the ratio of the observed neutron output and the nominal neutron output is formed in step 802. The ratio is associated with a depth in 803. In the final step 820, the observed activation is divided by the ratio from step 803 in order to obtain an activation normalized to the nominal neutron output.

Yet another correction may account for the fact that the activation may change during the time it takes a tool to pass an activated section, in particular an interface between two different lithologies. If we assume that the tool is penetrating a new formation layer, which may show a lot of activation, such as a sandstone, at a small angle, the activation may decrease from the time the detector first sees activation from the formation below the interface in the down orientation to the time the detector in the up orientation stops seeing the formation above the interface (lower activation). This may make the image less clear. This effect may be corrected, if the half-life of the main affected isotope (such as $^{28}$Al) is known. This may be done by dividing the observed signal by the calculated remaining fraction from the time of activation to the time of observation.

Figure 9:
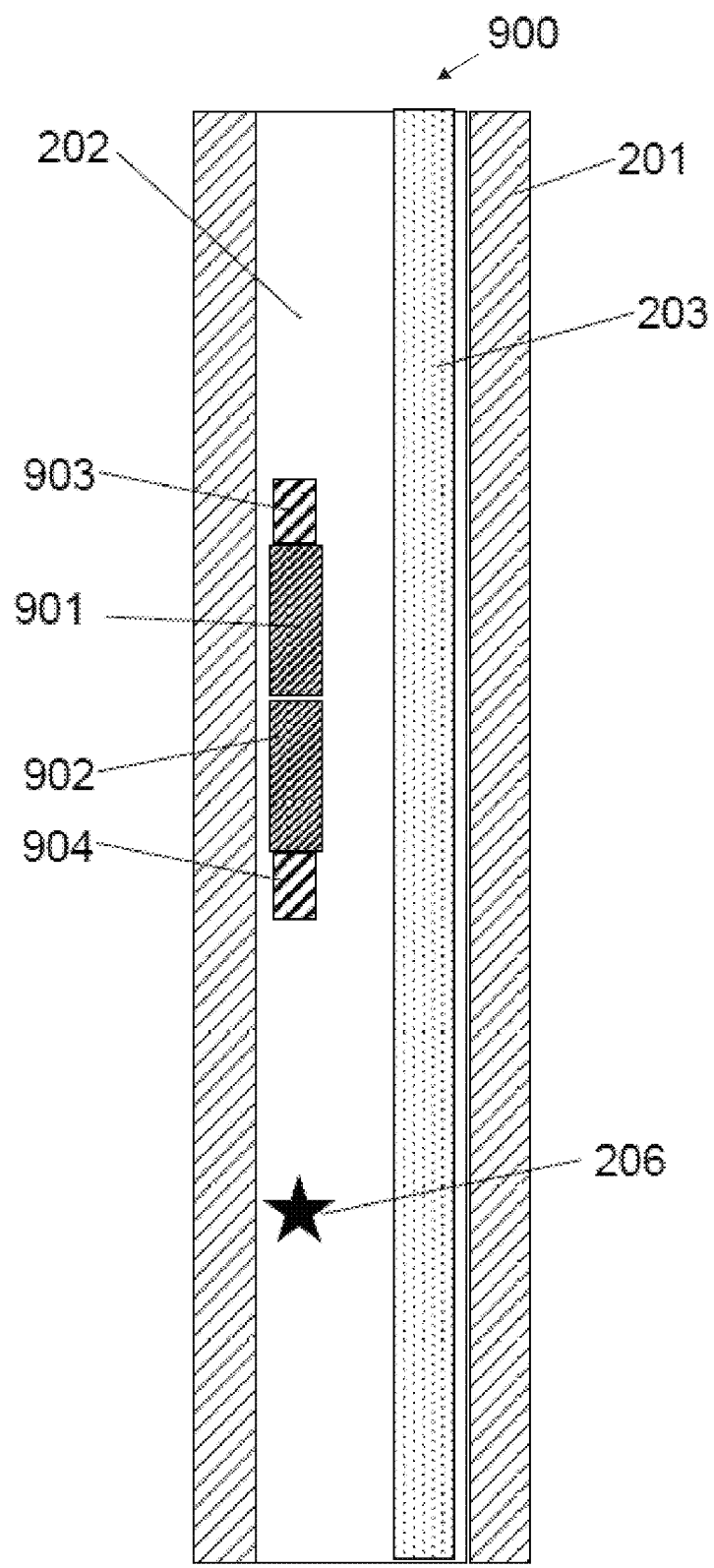
FIG. 9 is a logging while drilling tool with two gamma ray detectors mounted face-to-face

The quality and resolution of the images obtained are dominated by the counting statistics, the axial resolution of the detector and the azimuthal resolution of the detector. The image resolution can be enhanced by reducing the axial and azimuthal aperture of the detectors, so as to only admit gamma rays from a limited azimuthal and axial interval. However, restricting the aperture will result in a concomitant reduction of the counting rates in the detector(s) and an increase in the statistical error. This aspect can be counteracted by using more than one detector, e.g. multiple detectors at the same axial distance but at several azimuths on the tool. An example is shown in U.S. Pat. No. 6,944,548 assigned to Schlumberger. It could also be envisaged to have several detectors at different axial spacings. These could be two detectors face-to-face as indicated in FIG. 9. The detectors are installed in a chassis 202, which is installed in a drill collar 201. The chassis has a mud channel 203. Two scintillation detectors with scintillation crystals 901 and 902 and photomultipliers 903 and 904 respectively are shown front-to-front above (trailing) a neutron source 206. More generally, the detectors could form an array of detectors at different azimuths and axial spacings to allow a high resolution image in azimuth and axial direction.

The embodiments of the method shown in the preceding sections focused on the measurement of total gamma ray counts. As is well known in the art, there is more information in the detector response, which relates to the gamma ray spectrum, which may provide a unique finger print of the isotope from which the gamma rays were emitted. The spectrum can be decomposed into the contributions from several isotopes that may be present in a formation or borehole when activated by a neutron source. In order to make the spectral decomposition it may be necessary to determine spectral responses for all isotopes that may contribute to an activation spectrum. These elemental (isotopic) response or standard spectra may be obtained through measurement or modeling or a combination of the two.

If the spectra are acquired as a function of azimuth, then it is possible to obtain images of the azimuthal and axial distributions of activated elements as indicated for example in U.S. Pat. No. 5,539,225. The correction for the contributions from natural radioactivity can be done as described previously. Alternatively, the additional responses can be accounted for by adding spectral standards for the naturally occurring radioactive elements Th, U and K and a standard for the gamma rays from oxygen activation.

So far it has been assumed that the detector is spaced far enough from the neutron source, so that no gamma rays from the direct inelastic or capture reactions of neutrons in the formation, borehole or tool are reaching the detector. This may involve a distance of about 100 to 200 cm between the neutron source and the gamma ray detector. In some cases, it may not be practical to add a detector at such distance just for the measurement of formation activation, rather a detector positioned closer to the neutron source may be used. In this case, the detector will detect a large number of gamma rays from inelastic interactions and from neutron capture.

Figure 10:
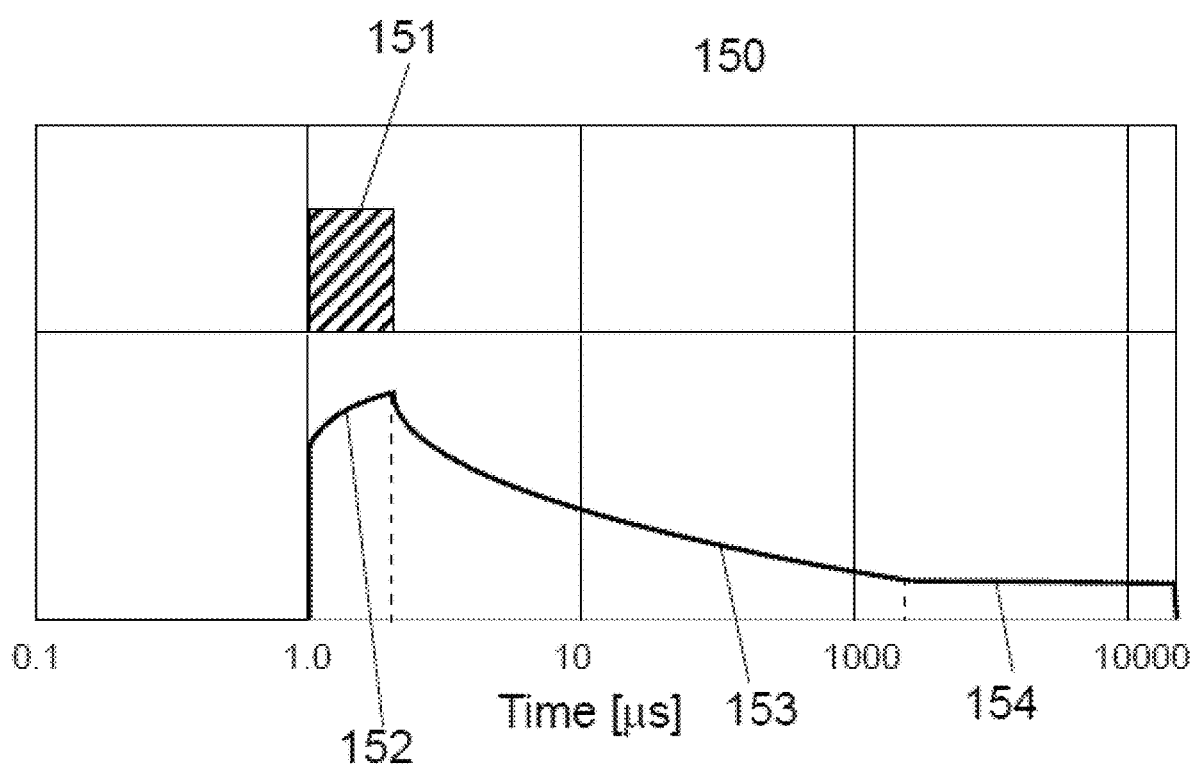
FIG. 10 is a schematic depiction of the neutron burst and the accompanying gamma rays over a period of about 10 ms.

FIG. 10 depicts the intensity of neutron induced gamma rays as a function of time after a neutron burst 151. During the burst 151, gamma rays from inelastic and capture reactions may be observed 152. After the burst, the neutrons are thermalized and gamma rays from epithermal and thermal neutron capture 153 are observed until most if not all neutrons have been absorbed by the materials in the tool and surrounding the tool. This takes from about 0.5 ms to several ms depending on the capture cross section of the formation and borehole. If one waits more than about 3 ms, then the only remaining gamma rays 154 come from activation and from natural radioactivity.

Therefore, it may be possible to choose a pulse sequence that allows for more time to measure activation. Typically, there may be a sequence of pulses followed by a short capture interval. After a given number of neutron bursts, a longer pause may be selected, during which activation may be observed. As an example there may be a sequence of 50 20-μs bursts followed by an 80-μs decay interval. This sequence of bursts may be followed by a 10-ms pause. This amounts to a 1-ms on-time for the neutron bursts, 4 ms of short decay intervals and 8 ms (out of the 10 ms) for the observation of activation. This means that the neutrons are only on during $\frac{1}{15}^{th}$ of the time. This corresponds to a duty factor of 6.7% for inelastic gamma ray measurements, about 27% of the time for capture gamma ray measurements and about 53% for activation. Since in most cases, the measurement of inelastic and capture gamma rays may have the highest priority, such a timing scheme may not be viable in many applications. More typical timing schemes may only allocate about 5 to 10% of the total time to the determination of activation. Examples of neutron burst sequences can be found in U.S. Pat. No. 6,703,606 assigned to Schlumberger.

If activation is observed with a detector that also registers inelastic and capture gamma rays, there will be an additional contribution from oxygen activation in the borehole and the formation. This can be corrected as described in the preceding sections by either subtracting the O-contribution up front by subtracting an oxygen fraction from the spectrum or the oxygen fraction can be determined through spectral fitting at the same time as the other contributions. Similarly, the contribution from natural gamma ray activity can be subtracted out based on information from a spectral natural gamma ray detector leading the neutron source and unaffected by activation other than oxygen (in the mud channel). Alternatively, spectral standards for the naturally occurring elements Th, U and K may be added for the fitting process.

The embodiments shown so far have concerned logging while drilling tools. It is also possible to measure activation using a tool conveyed on wireline, slickline, coil tubing, drill pipe (tough logging conditions, TLC) or through pipe conveyed to name a few. These are typically non-rotating tools. Azimuthal or image information may be obtained with a tool having multiple detectors at the same axial position, which are sensitive to a different direction, such as the segmented detector described in U.S. Pat. No. 6,781,115 assigned to Schlumberger. This approach can also be used in a while drilling tool with multiple detectors when the tool is not rotating (sliding) or rotating too slowly as may be encountered when drilling with a downhole motor.

Figure 11:
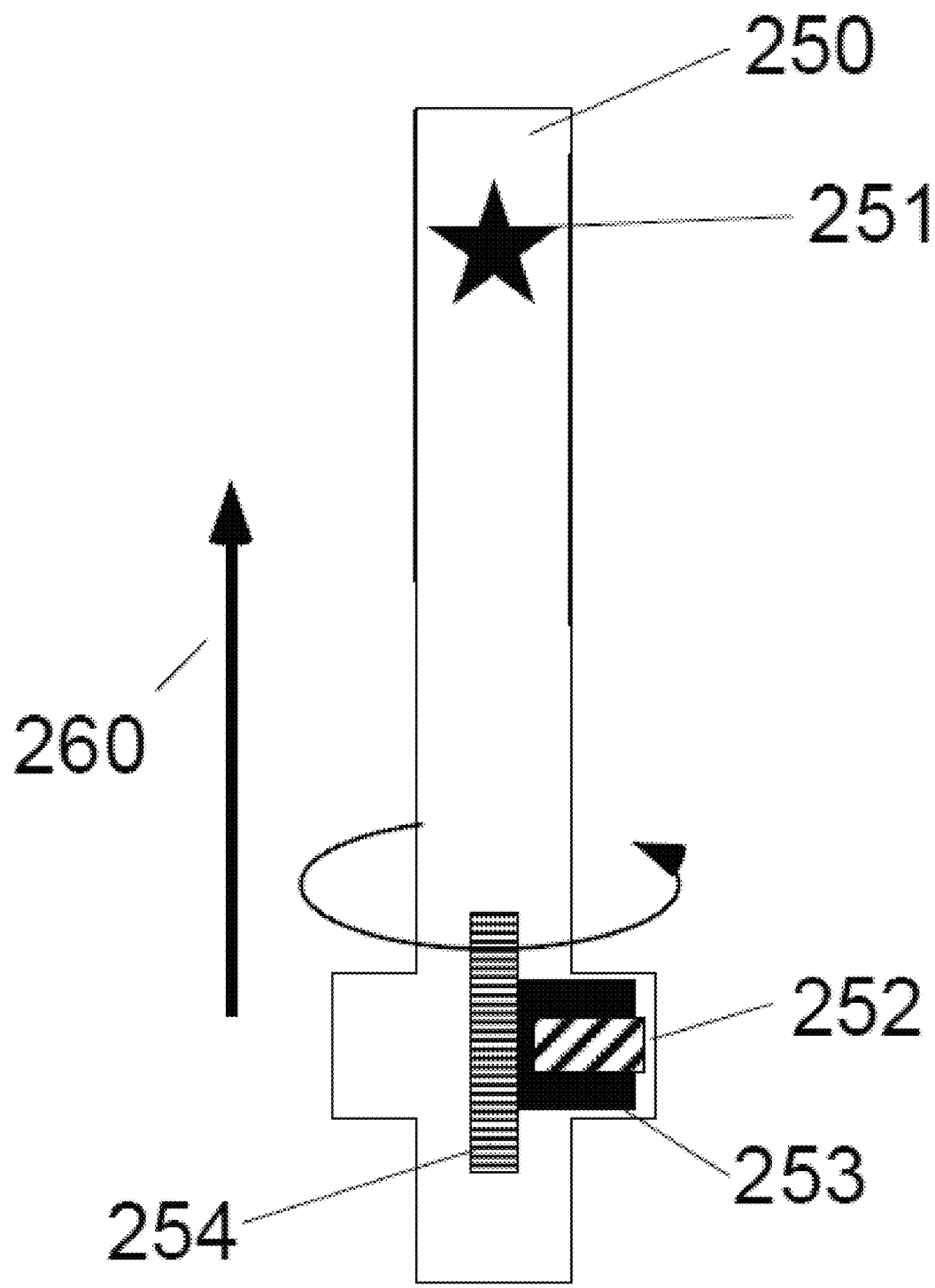
FIG. 11 is a depiction of a possible embodiment of a rotating gamma ray detector for use in wireline or in other situations where the tool is not rotating.

In yet another embodiment, a back-shielded gamma ray detector could be built into a rotating sonde section in a wireline tool. This would allow scanning the formation with the detector. In order to enhance the counting statistics, such a tool could contain more than one detector in a rotating section. FIG. 11 shows a schematic arrangement of a WL neutron tool 250 containing a neutron source 251 positioned above the gamma ray detector 252 with shielding 253 in the enlarge part of the housing 255. The detector can rotate around the axis 254 to scan the formation activity. Obviously, additional detectors pointing to different azimuths could be placed in the enlarged housing to improve the measurement statistics. It would also be possible in a slightly taller enlarged section 254 to have the detector(s) mounted vertically but still focused through collimation. The solution shown places the gamma ray detector and the mechanism to rotate it inside the housing, thus avoiding the rotating seals needed for rotation of an entire exterior sonde section. Since most wireline logging is done logging up 260, the neutron source 251 is placed above the detector that measures activation. In order to work, the tool needs to include also a measurement system that records the tool orientation as a function of depth.

In yet another embodiment of the method, the logging tool is equipped with gamma ray detectors positioned symmetrically around the neutron source, i.e. at the same axial spacing above and below the neutron source, the axial spacing being such that the detectors measure inelastic and capture gamma rays in addition to the formation activation. From the difference of the leading and trailing gamma ray measurement at the same depth and normalized for the same neutron output, one can determine the activation contribution.

The method can be used to determine bed boundaries for geosteering, to measure formation dip with respect to the tool axis and to identify fractures in the formation as an example.

The data processing may be done entirely by a controller in the downhole tool, where such a controller may comprise a microprocessor, digital signal processor (DSP) or a field programmable gate array (FPGA) or a combination thereof for an example. Some or all of the data may be transmitted to a controller at the surface, where such a controller may be a computer or processor, which may further process the data. The data transmission to the surface may be done through mud telemetry, wired drill pipe, electromagnetic transmission, wireline or fiber optic to name a few. The data at the surface may further be transmitted to other computers at a computing center, a client office etc. by wired or wireless data transmission. Further data processing and analysis may be performed there on a single computer or multiple processors. It should therefore be understood that when "a controller" or "the controller" is recited in the claims, that term is referring to any of the above described controllers, either alone, or in combination with one or more of the other controllers, and that thus the terms "a controller" and "the controller" encompass all such devices described above. For example, this means that a method step performed by "a controller" may be performed by a microprocessor in the downhole tool, while another method step performed by "the controller" may be performed by a computer at the surface, or other computers at a computing center.

Data may be stored in the downhole tool, in particular if all the data cannot be transmitted to the surface in real time. The data may be stored in storage media such as flash memory, DRAM or SRAM. When the tool returns to surface the data may be transferred to a surface computer connected to one or more storage devices such as a magnetic hard drive, a solid state drive, DVD or CD etc. The storage device may be attached to the surface computer or may be remote.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. A method for acquiring azimuthal data from activation of a formation by a neutron source comprising:
    moving a downhole tool through a borehole in the formation;

in the downhole tool generating neutrons that interact with elements in the formation to activate the formation and create radioactive isotopes with half-lives, using the neutron source;

pausing generating neutrons for a sufficiently long period of time such that gamma rays detected by one or more gamma ray detectors of the downhole tool comprise primarily activation gamma rays resulting from decay of the radioactive isotopes with half-lives;

removing, via a controller, at least a portion of the activation gamma rays attributable to oxygen activation from the activation gamma rays;

processing, via the controller, the remaining activation gamma rays and associating the remaining activation gamma rays with a tool azimuth;

determining, via the controller, at least one formation property from the detected activation gamma rays associated with the tool azimuth.

2. The method of claim 1, wherein the neutron source comprises a neutron generator or a pulsed neutron generator.

3. The method of claim 2, wherein the pulsed neutron generator is a d-T generator or a t-T generator.

4. The method of claim 3, wherein an output of the neutron source is measured with a neutron monitor device.

5. The method of claim 1, wherein the downhole tool includes at least one gamma ray detector trailing the neutron source at a distance, at which substantially no capture gamma rays resulting from the neutron interactions are detected.

6. The method of claim 5, wherein the distance is greater than 100 cm.

7. The method of claim 1, wherein the downhole tool includes at least one second detector leading the neutron source at a distance, at which substantially no inelastic or capture gamma rays resulting from the neutron interactions are detected.

8. The method of claim 7, wherein the at least one second detector is detecting natural gamma rays from the formation and the borehole.

9. The method of claim 8, wherein the natural gamma ray measurement is used to correct the measurement of the trailing gamma ray detector for contributions from natural gamma rays.

10. The method of claim 1, wherein the at least one formation property is a formation boundary.

11. The method of claim 1, wherein the at least one formation property is an activation image of the formation.

12. The method of claim 1, wherein the at least one formation property is a formation dip.

13. The method of claim 1, wherein the at least one formation property is a difference or ratio between an up and a down measurement of the formation activation.

14. The method of claim 1, wherein the activation measurement is corrected for activation decay based upon known half-lives and a known elapsed time from an end of the activation.

15. A method for well logging comprising:
moving a downhole tool through a borehole in an earth formation, the tool being equipped with a neutron source and at least one gamma ray detector;
generating neutrons, using the neutron source;
the neutrons interacting with elements in the formation to create radioactive isotopes with half-lives;
pausing generating neutrons for a sufficiently long period of time such that gamma rays measured by the at least one gamma ray detector comprise primarily activation gamma rays resulting from decay of the radioactive isotopes;
inputting counts of the measured activation gamma rays to a controller;
processing the measured activation gamma rays, wherein the measured activation gamma rays are corrected for a signal from oxygen activation;
associating the processed activation gamma rays with a tool azimuth to create an azimuthal gamma ray measurement; and
from the azimuthal gamma ray measurement determining at least one formation property, in the controller.

16. The method of claim 15, wherein the downhole tool includes at least one leading gamma ray detector leading the neutron source at an axial distance, at which it does not detect inelastic or capture gamma rays resulting from the interaction of the neutrons from the neutron source with materials in the earth formation or the borehole.

17. The method of claim 16, wherein the at least one leading gamma ray detector measures natural gamma rays.

18. The method of claim 17, wherein background from gamma rays from the oxygen activation of mud in the borehole is subtracted from a signal measured in the at least one leading gamma ray detector, generating an oxygen-activation corrected natural gamma ray signal.

19. The method of claim 18, wherein the oxygen-activation corrected natural gamma ray signal from the at least one leading gamma ray detector is subtracted from an oxygen-activation corrected signal of a trailing gamma ray detector to form a net activation signal.

20. The method of claim 19, wherein the net activation signal is corrected for activation decay using known half-lives of activated elements and a known elapsed time between activation and detection.

21. The method of claim 15, wherein the at least one gamma ray detector is collimated to improve the azimuthal or vertical resolution.

22. A method for well logging comprising:
moving a non-rotating logging tool through a borehole in an earth formation, the non-rotating logging tool being equipped with a neutron source and at least one gamma ray detector;
in the neutron source generating neutrons;
the neutrons interacting with elements in the formation to create radioactive isotopes with half-lives;
pausing generating neutrons for a sufficiently long period of time such that gamma rays detected by the at least one gamma ray detector comprise primarily activation gamma rays resulting from decay of the radioactive isotopes with half-lives;
inputting the detected activation gamma rays in a controller and processing the detected activation gamma rays, wherein the detected activation gamma rays are corrected for a presence of oxygen activation;
associating the detected activation gamma rays with a tool azimuth to generate an azimuthal gamma ray measurement; and
from the azimuthal gamma ray measurement, determining at least one formation property, in the controller.

23. The method of claim 22, wherein the at least one gamma ray detector comprises multiple trailing gamma ray detectors sensitive to different azimuthal directions.

24. The method of claim 22, wherein the oxygen activation corresponds to activated oxygen in mud in the borehole or the earth formation.

25. The method of claim 22, wherein the non-rotating logging tool includes at least one leading gamma ray detector.

26. The method of claim 23, wherein the at least one leading gamma ray detector measures natural gamma rays.

27. The method of claim 22, wherein a first measurement of the activation gamma rays by the at least one gamma ray detector is corrected for background from natural gamma rays using a second measurement taken by at least one leading gamma ray detector.

28. The method of claim 22, wherein the at least one gamma ray detector rotates to azimuthally scan the formation.

29. The method of claim 22, wherein the at least one gamma ray detector is collimated to improve the azimuthal or vertical resolution.

30. The method of claim 22, wherein the at least one gamma ray detector comprises multiple trailing gamma ray detectors with different azimuthal orientations, at least some of which are rotating.

31. A method for acquiring azimuthal data from the activation of a formation by a neutron source comprising:

in a downhole tool generating neutrons using the neutron source;

moving the downhole tool through the borehole in the formation;

the interaction of the neutrons with elements in the formation creating radioactive isotopes with half-lives;

pausing generating neutrons for a sufficiently long period of time such that gamma rays detected by one or more gamma ray detectors comprise primarily activation gamma rays, wherein the one or more gamma ray detectors measures an activation gamma ray spectra resulting from decay of the radioactive isotopes with half-lives;

in a controller processing the activation gamma ray spectra and associating them with an azimuth of the tool to generate azimuthal activation gamma ray spectra, wherein at least a portion of the activation gamma ray spectra attributable to oxygen activation is removed from the activation gamma ray spectra;

in a controller further processing the azimuthal activation gamma ray spectra to determine at least one activated isotope other than oxygen;

in the controller from the at least one activated isotope determining at least one formation property.

* * * * *